(12) United States Patent
Ogawara

(10) Patent No.: US 10,379,457 B2
(45) Date of Patent: Aug. 13, 2019

(54) IMAGE FORMING APPARATUS

(71) Applicant: CANON KABUSHIKI KAISHA, Tokyo (JP)

(72) Inventor: Satoshi Ogawara, Koshigaya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/817,425

(22) Filed: Nov. 20, 2017

(65) Prior Publication Data

US 2018/0149994 A1    May 31, 2018

(30) Foreign Application Priority Data

Nov. 28, 2016 (JP) ................................ 2016-230564

(51) Int. Cl.
| | |
|---|---|
| *G03G 15/02* | (2006.01) |
| *H02M 3/335* | (2006.01) |
| *H02M 1/14* | (2006.01) |
| *H02M 1/08* | (2006.01) |
| *H02M 1/00* | (2006.01) |

(52) U.S. Cl.
CPC .......... *G03G 15/0283* (2013.01); *H02M 1/08* (2013.01); *H02M 1/14* (2013.01); *H02M 3/33546* (2013.01); *H02M 2001/0009* (2013.01)

(58) Field of Classification Search
CPC ...... H02M 1/08; H02M 1/14; H02M 3/33546; H02M 2001/0009; G03G 15/0233; G03G 15/0283
See application file for complete search history.

(56) References Cited

U.S. PATENT DOCUMENTS

| | | | | |
|---|---|---|---|---|
| 4,564,287 A | * | 1/1986 | Suzuki | G03G 15/5037 399/43 |
| 5,469,243 A | * | 11/1995 | Saitoh | G03G 15/0266 399/171 |
| 5,983,045 A | * | 11/1999 | Suzuki | H04N 1/506 399/178 |
| 2006/0147227 A1 | * | 7/2006 | Lee | G03G 15/0233 399/176 |
| 2015/0023677 A1 | * | 1/2015 | Kanehara | G03G 15/0266 399/50 |
| 2015/0109831 A1 | * | 4/2015 | Ohashi | H02M 3/33507 363/21.06 |

(Continued)

FOREIGN PATENT DOCUMENTS

| | | | |
|---|---|---|---|
| JP | 52129475 A | * | 10/1977 |
| JP | 2010044127 A | | 2/2010 |

*Primary Examiner* — Susan S Lee
(74) *Attorney, Agent, or Firm* — Rossi, Kimms & McDowell LLP

(57) ABSTRACT

A first high-voltage power supply includes a first transformer configured to generate a voltage to be supplied to a first wire of a charger, and a second high-voltage power supply includes a second transformer configured to generate a voltage to be supplied to a second wire of the charger. The first and second high-voltage power supplies respectively drive the first and second transformers in accordance with pulse signals that are supplied from a CPU and that have the same frequency and phase. The first and second high-voltage power supplies respectively supply, to the first and second wires of the charger, voltages generated by driving the first and second transformers.

13 Claims, 10 Drawing Sheets

(56) References Cited

U.S. PATENT DOCUMENTS

| | | | |
|---|---|---|---|
| 2016/0161878 A1* | 6/2016 | Kitajima | G03G 15/0266 |
| | | | 399/50 |
| 2017/0023904 A1* | 1/2017 | Hakamada | G03G 15/80 |
| 2017/0315495 A1* | 11/2017 | Suzuki | H02M 3/33546 |
| 2018/0034311 A1* | 2/2018 | Zhang | H02J 7/06 |
| 2018/0046122 A1* | 2/2018 | Kitajima | G03G 15/0233 |
| 2018/0123383 A1* | 5/2018 | Tian | H02J 7/045 |

* cited by examiner

IMAGE FORMING APPARATUS

BACKGROUND OF THE INVENTION

Field of the Invention

The present invention relates to an electrophotographic image forming apparatus.

Description of the Related Art

An electrophotographic image forming apparatus forms an electrostatic latent image by uniformly charging the surface of a photosensitive member by a charging device and exposing the charged photosensitive member by an exposure device. After that, the image forming apparatus forms a toner image by developing the electrostatic latent image with a developing material such as toner. As the charging device, for example, a scorotron charger including a casing, a grid (grid electrode), and a discharge wire (discharge electrode) is widely used. The scorotron charger can control the charged charges of the photosensitive member by a bias voltage (grid bias) to be applied to the grid, and has high controllability of the charging potential of the photosensitive member.

Japanese Patent Laid-Open No. 2010-44127 describes an image forming apparatus that can operate at a plurality of process speeds (rotation speeds of a photosensitive member), and includes a charger with a plurality of wires to obtain a discharge current necessary for each process speed. The image forming apparatus described in Japanese Patent Laid-Open No. 2010-44127 is provided with a high-voltage power supply for each of the plurality of wires of the charger to individually control a high voltage to be supplied to each wire. Furthermore, to control the charging potential of the photosensitive member to a potential appropriate for each process speed, the number of wires to be supplied with high voltages is switched in accordance with the process speed.

As described above, in the charger with the plurality of wires (discharge electrodes), a stray capacitance can be generated between two adjacent wires to form a current path. A ripple current flows through the current path due to ripple components contained in the output voltages of the high-voltage power supplies connected to the respective wires. The ripple current generated when the plurality of high-voltage power supplies operate may become large due to differences in the frequencies and phases between driving signals for respectively driving the plurality of high-voltage supplies. As the ripple current becomes larger, the surface temperature of a member of the charger, which serves as the current path, locally rises, thereby generating tracking phenomenon in the member. To prevent generation of such tracking phenomenon, it is necessary to perform insulation design, for example, increase the distance between the wires. However, this unwantedly prevents the apparatus from being downsized, and increases the apparatus cost.

SUMMARY OF THE INVENTION

The present invention has been made in consideration of the above-described problems. The present invention provides a technique of reducing, in an image forming apparatus provided with a high-voltage power supply for each of a plurality of discharge electrodes of a charger, a ripple current flowing via a stray capacitance generated between the discharge electrodes.

According to one aspect of the present invention, there is provided an image forming apparatus comprising: a photosensitive member; a charger including a first discharge electrode and a second discharge electrode and configured to charge the photosensitive member by discharge caused by voltages being supplied to the first discharge electrode and the second discharge electrode; a first high-voltage power supply including a first transformer that generates a voltage to be supplied to the first discharge electrode and configured to supply, to the first discharge electrode, the voltage generated by driving the first transformer in accordance with a first pulse signal; and a second high-voltage power supply including a second transformer that generates a voltage to be supplied to the second discharge electrode and configured to supply, to the second discharge electrode, the voltage generated by driving the second transformer in accordance with a second pulse signal having frequency and phase identical with those of the first pulse signal.

According to the present invention, in an image forming apparatus provided with a high-voltage power supply for each of a plurality of discharge electrodes of a charger, it is possible to reduce a ripple current flowing via a stray capacitance generated between the discharge electrodes.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

The first embodiment of an image forming apparatus 100 provided with a high-voltage power supply for each of a plurality of discharge electrodes of a charger will be described first. Although the image forming apparatus 100 may be an image forming apparatus for forming a monochrome image, in this embodiment, an image forming apparatus for forming a multicolor image using toners (developing materials) of a plurality of colors is assumed. The image forming apparatus 100 may be, for example, any one of a printing apparatus, a printer, a copy machine, a multifunction peripheral (MFP), and a facsimile apparatus.

<Image Forming Apparatus>

Figure 1:
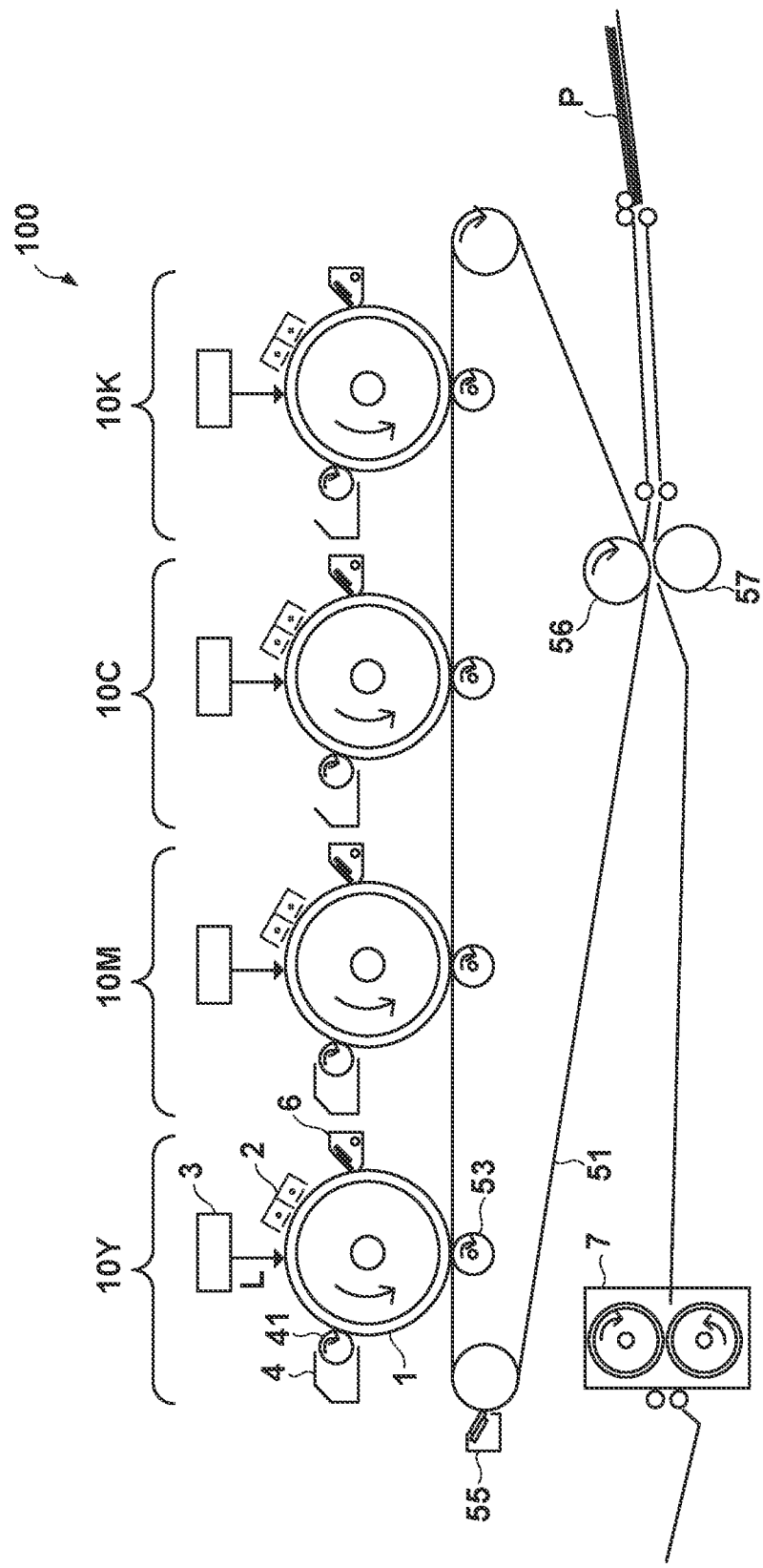
FIG. 1 is a sectional view showing the schematic arrangement of an image forming apparatus.

FIG. 1 is a sectional view showing the schematic arrangement of the image forming apparatus 100 according to this embodiment. The image forming apparatus 100 shown in FIG. 1 includes four image forming stations 10Y, 10M, 10C, and 10K for respectively forming toner images by a electrophotographic method using toners of four colors of yellow (Y), magenta (M), cyan (C), and black (K). In FIG. 1, only the constituent parts of the station 10Y corresponding to yellow are denoted by reference numerals. However, the four stations 10Y, 10M, 10C, and 10K can adopt the same arrangement. Each station 10 (10Y, 10M, 10C, or 10K) of the image forming apparatus 100 includes a photosensitive drum 1 (photosensitive member), a charger 2, an exposure unit 3, a developing unit 4, a developing sleeve 41 in the developing unit, a primary transfer roller 53, and a drum cleaner 6. The image forming apparatus 100 also includes an intermediate transfer belt 51, a belt cleaner 55, secondary transfer rollers 56 and 57, and a fixing unit 7. Each station 10 is an example of an image forming unit configured to form, on the photosensitive drum 1, an image to be transferred to a sheet P by forming an electrostatic latent image on the photosensitive drum 1 charged by the charger 2 and developing the electrostatic latent image using the toner.

Figure 6:
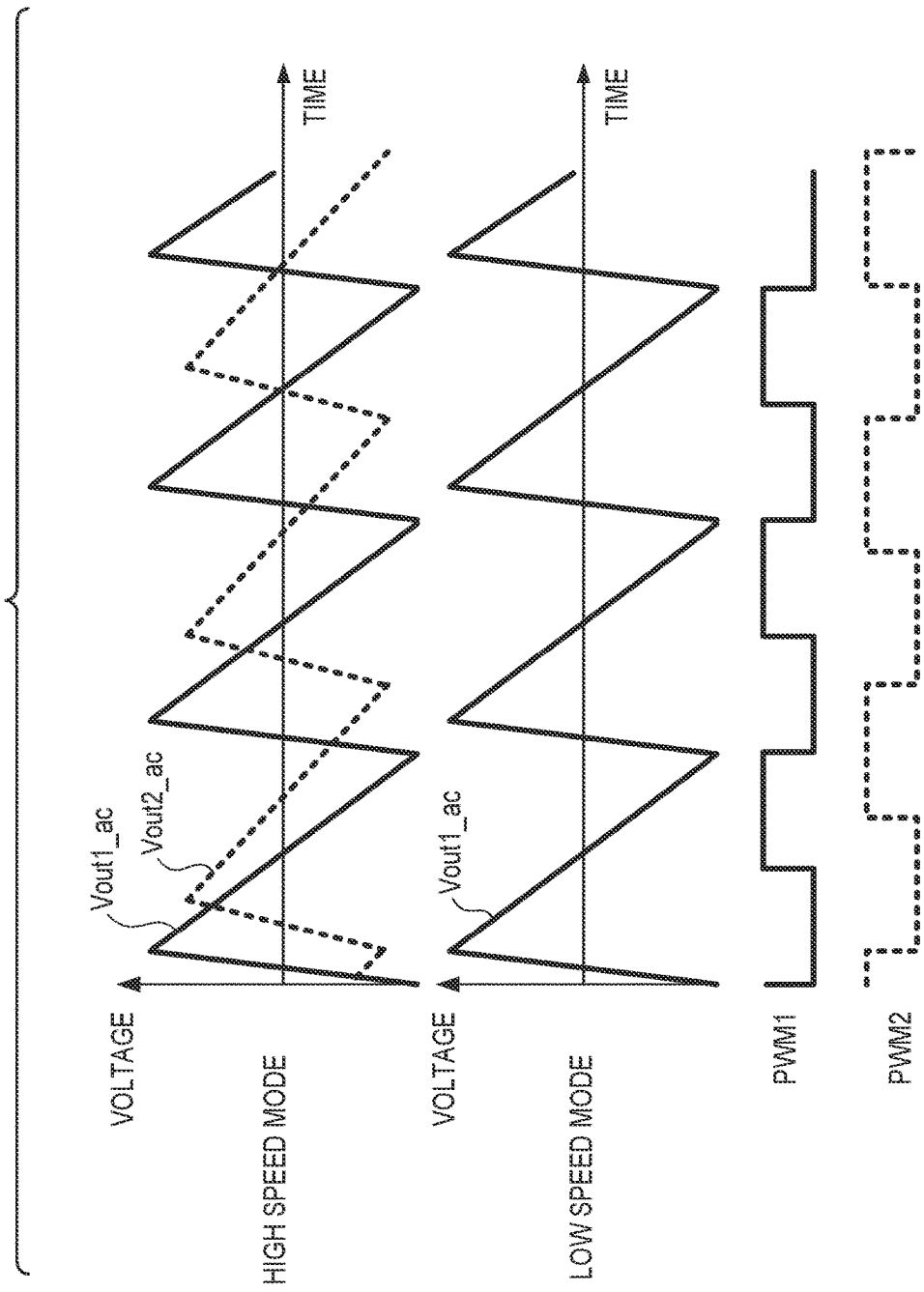
FIG. 6 shows examples of waveforms of the pulse signal PWM1 and a pulse signal PWM2 and waveforms of the ripple components of output voltages in the charging high-voltage power supply according to the comparative example.

Upon receiving an image forming command, a CPU 210 (FIG. 6) of the image forming apparatus 100 starts to rotate the photosensitive drums 1, the developing sleeves 41, the intermediate transfer belt 51, the primary transfer rollers 53, the secondary transfer roller 57, and fixing rollers in the fixing unit 7. Each photosensitive drum 1 is driven by a drum motor (not shown). Each charger 2 uniformly charges the surface of the photosensitive drum 1 by a high voltage being applied by a corresponding high-voltage power supply (FIG. 6). Each exposure unit 3 outputs a laser beam (light beam) L modulated based on an image signal, and scans the surface of the photosensitive drum 1 with the laser beam. This forms an electrostatic latent image on the photosensitive drum 1. Each developing unit 4 (developing sleeve 41) develops the electrostatic latent image using the toner by a high voltage being applied by the corresponding high-voltage power supply (not shown), thereby forming a toner image on the photosensitive drum 1. Each primary transfer roller 53 transfers the toner image on the photosensitive drum 1 to the intermediate transfer belt 51. Note that a DC high voltage for transferring the toner image is applied from the high-voltage power supply (not shown) to the corresponding primary transfer roller 53 and the secondary transfer roller 57.

The toner images on the intermediate transfer belt 51 are conveyed to a secondary transfer portion formed by the intermediate transfer belt 51 and the secondary transfer roller 57. During this conveyance operation, the toner images of the respective colors formed on the photosensitive drums 1 of the respective stations 10 are sequentially transferred to be superimposed onto the intermediate transfer belt 51, thereby forming a multicolor toner image on the intermediate transfer belt 51. In the secondary transfer portion, the toner image is transferred onto the sheet P fed from a feeding unit (feeding tray or the like) and conveyed through a conveyance path. The sheet P may be called, for example, printing paper, a printing material, a printing medium, a sheet, a transfer material, or transfer paper. The toner image transferred onto the sheet P is applied with heat and pressure by the fixing unit 7, and thus fixed on the sheet P. After that, the sheet P is discharged to a discharge unit (discharge tray or the like). The toner remaining on each photosensitive drum 1 is recovered by the corresponding drum cleaner 6. The toner remaining on the intermediate transfer belt 51 is recovered by the belt cleaner 55.

<Charging Unit and High-Voltage Power Supply>

Figure 2:
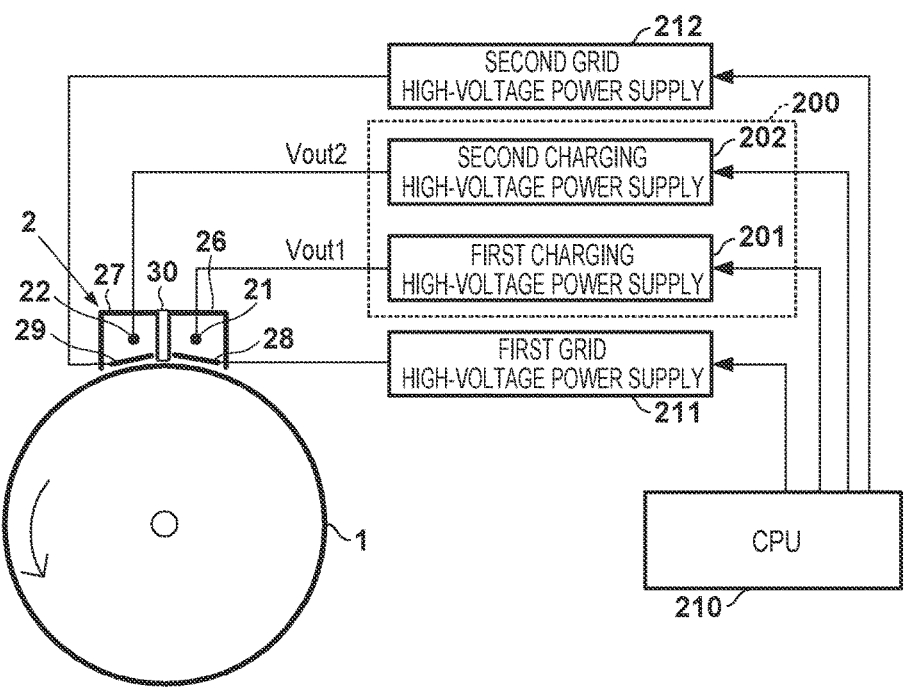
FIG. 2 is a block diagram showing an example of the arrangement of a charger and high-voltage power supplies for the charger.

FIG. 2 is a block diagram showing an example of the arrangement of the charger 2 and high-voltage power supplies for supplying high voltages to the charger 2. The charger 2 is a scorotron charger formed from first and second wires 21 and 22 (discharge electrodes) each formed by a fine metal line, first and second casings 26 and 27 made of a metal, and first and second grids 28 and 29 (first and second grid electrodes) made of a metal. The charger 2 includes two wires, that is, the first and second wires 21 and 22. The first wire 21 (first discharge electrode) is provided in the first casing 26. The second wire 22 (second discharge electrode) is provided in the second casing 27 insulated from the first casing 26 by an insulating member 30. The charger 2 is an example of a charger configured to charge the photosensitive drum 1 by discharge caused by voltages being supplied to the first and second wires 21 and 22.

In this embodiment, a high-voltage power supply serving as a supply source of a high-voltage is provided for each of the first and second wires 21 and 22 so as to individually control a high voltage to be supplied to each wire in accordance with the process speed of the image forming apparatus 100 (the rotation speed of the photosensitive drum 1). The image forming apparatus 100 has, as operation modes for image formation, a high speed mode of performing image formation at the first process speed and a low speed mode of performing image formation at the second process speed lower than the first process speed.

The first and second wires 21 and 22 are connected to first and second charging high-voltage power supplies 201 and 202, respectively. Note that the first and second charging high-voltage power supplies 201 and 202 form a charging high-voltage power supply 200. The first and second grids 28 and 29 are connected to first and second grid high-voltage power supplies 211 and 212, respectively. The first casing 26 has a potential equal to that of the first grid 28, and the second casing 27 has a potential equal to that of the second grid 29. The insulating member 30 is provided between the first casing 26 and the second casing 27 to insulate the first and second casings 26 and 27 from each other.

The CPU 210 corresponds to a controller for controlling an image forming process. The CPU 210 controls the output voltage value and ON/OFF of each high-voltage power supply by sending control signals to the first and second charging high-voltage power supplies 201 and 202 and the first and second grid high-voltage power supplies 211 and 212. The first and second charging high-voltage power supplies 201 and 202 apply high voltages Vout1 and Vout2 to the first and second wires 21 and 22 of the charger 2, respectively, thereby generating corona discharge in the first and second wires 21 and 22. The charger 2 charges the photosensitive member 1 using corona discharge. A charging current (discharge current) flowing to the photosensitive member 1 is controlled by the voltages (that is, grid biases) applied from the first and second grid high-voltage power supplies 211 and 212 to the first and second grids 28 and 29. Therefore, the surface potential of the photosensitive member 1 is controlled by the grid biases applied to the first and second grids 28 and 29.

Figure 3:
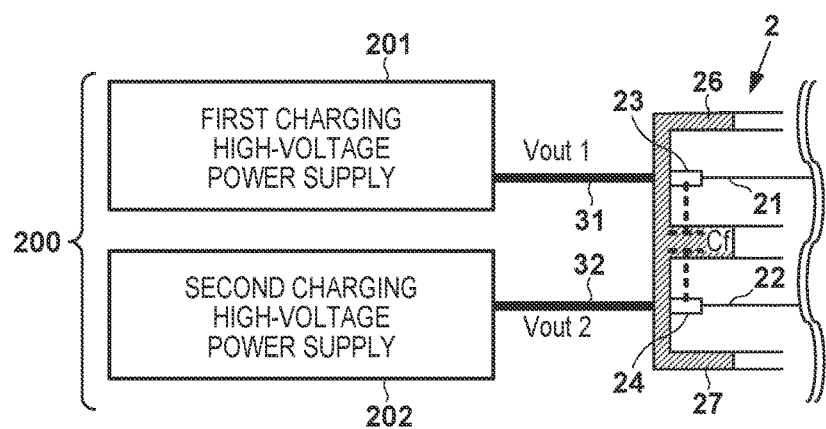
FIG. 3 is a schematic view showing power supply paths respectively from the first and second charging high-voltage power supplies to the charger.

FIG. 3 is a schematic view showing power supply paths respectively from the first and second charging high-voltage power supplies 201 and 202 to the charger 2. (Note that the "charging high-voltage power supply" will be simply referred to as the "high-voltage power supply" hereinafter.) The output voltage (high voltage) Vout1 of the first high-voltage power supply 201 is supplied to an electrode 23 of the charger 2 via a high voltage cable 31. The output voltage (high voltage) Vout2 of the second high-voltage power supply 202 is supplied to an electrode 24 of the charger 2 via a high voltage cable 32. The electrodes 23 and 24 are connected to the first and second wires 21 and 22, respectively. The output voltage Vout1 of the first high-voltage power supply 201 is applied to the first wire 21 via the electrode 23, and the output voltage Vout2 of the second high-voltage power supply 202 is applied to the second wire 22 via the electrode 24.

A stray capacitance Cf exists between the electrodes 23 and 24 of the charger 2, as represented by a capacitor indicated by dotted lines in FIG. 3. Therefore, when the AC high voltages Vout1 and Vout2 are applied to the first and second wires 21 and 22 via the electrodes 23 and 24, a ripple current flows between the electrodes 23 and 24 via the stray capacitance Cf. If the ripple current flowing between the electrodes 23 and 24 via the stray capacitance Cf becomes larger, the surface temperature of the member (a mold member made of a resin material) of the charger 2, which serves as a path through which the ripple current flows, locally rises, possibly leading to carbonization. As a result, tracking phenomenon in which a carbonized conductive path is formed between the electrodes 23 and 24 may be generated. In this embodiment, as will be described below, the first and second high-voltage power supplies 201 and 202 are formed to reduce the ripple current flowing between the electrodes 23 and 24 via the stray capacitance Cf.

<Comparative Example of High-Voltage Power Supply>

Before explaining details of the high-voltage power supply 200 according to this embodiment, a comparative example of the high-voltage power supply for supplying a high voltage to the charger 2 will be described with reference to FIGS. 4 to 6.

(Arrangement and Operation of High-Voltage Power Supply 400)

Figure 4:
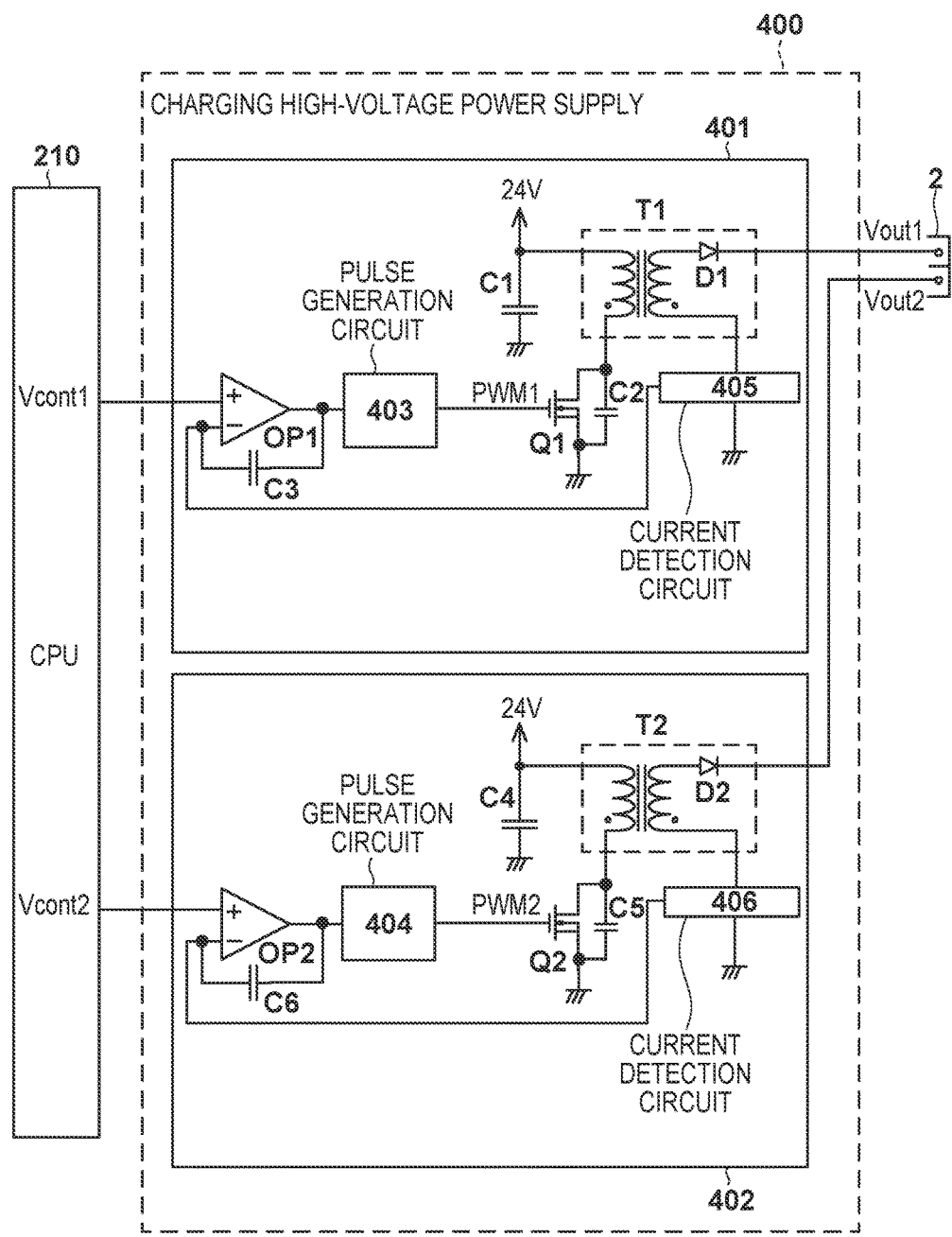
FIG. 4 is a circuit diagram showing the circuit arrangement of a charging high-voltage power supply according to a comparative example.

FIG. 4 is a circuit diagram showing the circuit arrangement of the high-voltage power supply 400 according to the comparative example. The high-voltage power supply 400 is formed by first and second high-voltage power supplies 401 and 402, and supplies a high voltage to each wire of the charger 2. The first and second high-voltage power supplies 401 and 402 correspond to the first and second high-voltage power supplies 201 and 202 according to this embodiment. The high-voltage power supply 400 has an arrangement in which it is possible to individually control output high voltages from the first and second high-voltage power supplies 401 and 402 to the wires of the charger 2.

The CPU 210 controls the operation of the high-voltage power supply 400 by control signals Vcont1 and Vcont2 in accordance with the operation mode of the image forming apparatus 100. If the operation mode of the image forming apparatus 100 is the low speed mode, the high-voltage power supply 400 operates to supply a high voltage from the first high-voltage power supply 401 to the first wire 21 of the charger 2 and stop the supply of a high voltage from the second high-voltage power supply 402. On the other hand, if the operation mode of the image forming apparatus 100 is the high speed mode, the high-voltage power supply 400 operates to supply a high voltage from the first high-voltage power supply 401 to the first wire 21 of the charger 2 and supply a high voltage from the second high-voltage power supply 402 to the second wire 22 of the charger 2.

The first high-voltage power supply 401 operates as follows in accordance with the control signal Vcont1 from the CPU 210. Note that the second high-voltage power supply 402 has the same arrangement as that of the first high-voltage power supply 401, and performs the same operation in accordance with the control signal Vcont2 from the CPU 210. The CPU 210 outputs, to the first high-voltage power supply 401, the control signal Vcont1 for controlling an output current from the first high-voltage power supply 401 (an output current from a transformer T1). The first high-voltage power supply 401 controls the output voltage of an operational amplifier OP1 so that the value of the control signal Vcont1 from the CPU 210 is equal to the value of a detection signal output from a current detection circuit (current detector) 405 for detecting an output current. With this control operation, the first high-voltage power supply 401 supplies, to the charger 2, an output current of a desired value corresponding to the value of the control signal Vcont1.

The output voltage of the operational amplifier OP1 is input to a pulse generation circuit (pulse generator) 403. The pulse generation circuit 403 outputs, to a switching element Q1, a pulse signal PWM1 having a pulse width that sets a current output from the secondary winding side of the transformer T1 to a desired value (a value corresponding to the target value of the output voltage of the first high-voltage power supply 401). The pulse signal PWM1 is generated as a pulse width modulation signal which changes between high (H) level and low (L) level, and in which a pulse for each cycle has a pulse width corresponding to the output voltage of the operational amplifier OP1. The switching element Q1 is switched (the ON/OFF operation of a gate is performed) in accordance with the pulse signal PWM1. For example, if the pulse signal PWM 1 is at H level, the switching element Q1 is set in an ON state. If the pulse signal PWM1 is at L level, the pulse signal PWM1 is set in an OFF state. The switching operation of the switching element Q1 controls the current flowing into the primary winding of the transformer T1. This generates an AC high voltage in the secondary winding of the transformer T1. The AC high voltage generated in the secondary wiring of the transformer T1 is rectified by a diode D1, and supplied to the charger 2 as the output voltage Vout1 of the first high-voltage power supply 401.

Figure 5:
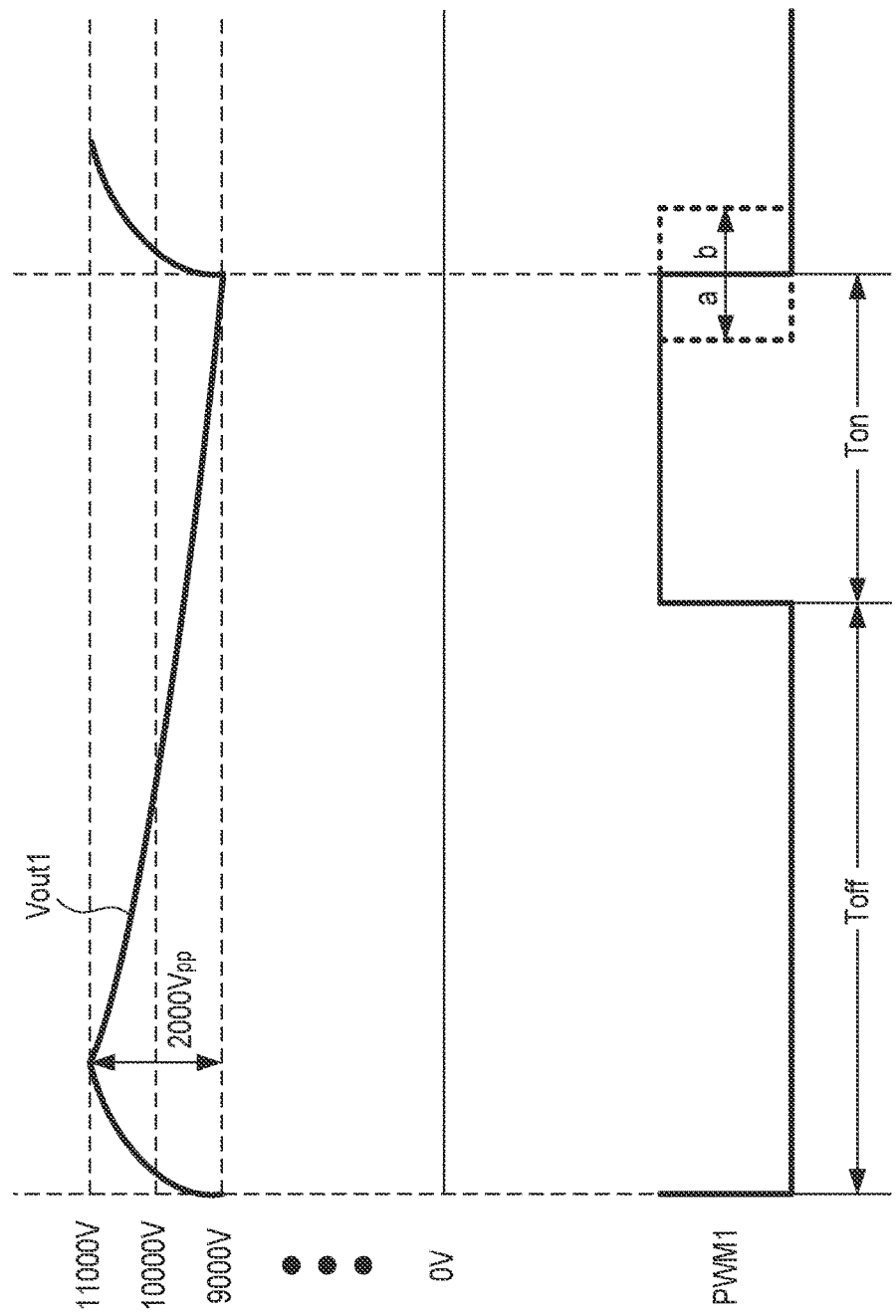
FIG. 5 shows examples of waveforms of a pulse signal PWM1 and an output voltage of a first charging high-voltage power supply in the charging high-voltage power supply according to the comparative example.

FIG. 5 shows examples of the waveform of the pulse signal PWM1 output from the pulse generation circuit 403 of the first high-voltage power supply 401 and the waveform of the output voltage Vout1 of the first high-voltage power supply 401. The first high-voltage power supply 401 causes the pulse generation circuit 403 to generate the pulse signal PWM1 that makes a length Toff of the OFF period of the switching element Q1 constant and changes a length Ton of the ON period of the switching element Q1 in accordance with the output voltage of the operational amplifier OP1.

More specifically, if the detection value of the output current detected by the current detection circuit 405 is smaller than the value of the control signal Vcont1, the first high-voltage power supply 401 increases the output current by prolonging the length Ton (widening the H level period of the pulse signal PWM1 in "b" direction in FIG. 5). On the other hand, if the detection value of the output current detected by the current detection circuit 405 is larger than the value of the control signal Vcont1, the first high-voltage power supply 401 decreases the output current by shortening the length Ton (narrowing the H level period of the pulse signal PWM1 in "a" direction in FIG. 5). The thus generated pulse signal PWM1 switches the switching element Q1, thereby controlling the output current of the first high-voltage power supply 401 to a desired value. Note that the frequency of the pulse signal PWM1 changes within a range of several kHz to several tens of kHz depending on the setting value of the output current instructed by the control signal Vcont1 and the impedance of the charger 2.

The high-voltage power supply 400 shown in FIG. 4 adopts an arrangement in which no smoothing capacitor is provided in an output portion on the secondary side of the transformer T1 or a transformer T2. The reason for this is as follows. In an arrangement in which no smoothing capacitor is provided in the output portion of the high-voltage power supply 400, the capacitance component of the output portion is equal to the small capacitance component of the charger 2. As a result, the waveform of the output voltage Vout1 includes a ripple component (in this example, about 2,000 Vpp) of a certain magnitude with respect to a DC component (in this example, about 10,000 V), as shown in FIG. 5. On the other hand, if a smoothing capacitor is provided in the output portion of the high-voltage power supply 400, the ripple component of the output voltage is small but an increase in capacitance component of the output portion increases the amount of charges accumulated in the capacitance component.

If the output portion of the high-voltage power supply 400 enters an abnormal state and a leak current is generated, charges accumulated in the capacitance component of the output portion are discharged. If a smoothing capacitor is provided in the output portion of the high-voltage power supply 400, discharge energy at the time of generation of a leak current increases by the amount of charges accumulated in the smoothing capacitor. If the reliability of insulation design such as generation of tracking phenomenon in the mold member made of a resin material is considered, it is necessary to decrease the capacitance component of the output portion of the high-voltage power supply 400 to decrease discharge energy. Consequently, no smoothing capacitor is provided in the output portion of the high-voltage power supply 400.

(Characteristic of High-Voltage Power Supply 400)

FIG. 6 shows examples of the waveform of the pulse signal PWM1 output from the pulse generation circuit 403 in the high-voltage power supply 400, the waveform of a pulse signal PWM 2 output from a pulse generation circuit 404 in the high-voltage power supply 400, and the waveforms of the ripple components of the output voltages of the high-voltage power supply 400 in each operation mode of the image forming apparatus 100. As described above, in the low speed mode, the first high-voltage power supply 401 supplies a high voltage to the first wire 21 and the supply of a high voltage from the second high-voltage power supply 402 is stopped. In the high speed mode, the first high-voltage power supply 401 supplies a high voltage to the first wire 21, and the second high-voltage power supply 402 supplies a high voltage to the second wire 22. In the high speed mode, the pulse signal PWM1 generated by the pulse generation circuit 403 of the first high-voltage power supply 401 and the pulse signal PWM2 generated by the pulse generation circuit 404 of the second high-voltage power supply 402 are asynchronous signals of different frequencies. Therefore, the pulse signals PWM1 and PWM2 have waveforms with different frequencies and phases, as shown in FIG. 6.

In FIG. 6, Vout1_ac represents the ripple component of the output voltage Vout1 of the first high-voltage power supply 401, and Vout2_ac represents the ripple component of the output voltage Vout2 of the second high-voltage power supply 402. As shown in FIG. 6, in the low speed mode, only the ripple component Vout1_ac corresponding to the first high-voltage power supply 401 is generated as the ripple component of the output voltage of the high-voltage power supply 400. On the other hand, in the high speed mode, both the ripple component Vout1_ac corresponding to the first high-voltage power supply 401 and the ripple component Vout2_ac corresponding to the second high-voltage power supply 402 are generated as the ripple components of the output voltages of the high-voltage power supply 400. Along with the occurrence of differences in frequency and phase between the pulse signals PWM1 and PWM2, the frequency and phase differences between Vout1_ac and Vout2_ac are generated.

A ripple current corresponding to such ripple components of the output voltages can flow between the electrodes 23 and 24 of the charger 2 via the stray capacitance Cf (FIG. 3) existing between the electrodes 23 and 24, as described above. When f1 represents the frequency of the pulse signal PWM1, f2 represents the frequency of the pulse signal PWM2, I1_ac represents a ripple current flowing through the stray capacitance Cf due to the ripple component Vout1_ac, and I2_ac represents a ripple current flowing through the stray capacitance Cf due to the ripple component Vout2_ac, the ripple currents I1_ac and I2_ac are given by:

$$I1\_ac = Vout1\_ac/(2\pi * f1 * Cf)$$

$$I2\_ac = Vout2\_ac/(2\pi * f2 * Cf)$$

Note that the ripple current I1_ac flows from the electrode 23 toward the electrode 24, and the ripple current I2_ac flows from the electrode 24 toward the electrode 23 (that is, in a direction opposite to that of the ripple current I1_ac).

The ripple current I_ac flowing through the stray capacitance Cf in a case in which the operation mode is the low speed mode is given, due to the supply of the high voltage from the second high-voltage power supply 402 to the charger 2 being stopped, by:

$$I\_ac = I1\_ac = Vout1\_ac/(2\pi * f1 * Cf)$$

The ripple current I_ac flowing through the stray capacitance Cf in a case in which the operation mode is the high speed mode is given, due to high voltages being supplied from the first and second high-voltage power supplies 401 and 402 to the charger 2, by:

$$I\_ac = I1\_ac + I2\_ac = Vout1\_ac/(2\pi * f1 * Cf) + Vout2\_ac/(2\pi * f2 * Cf)$$

As described above, if the pulse signals PWM1 and PWM2 are asynchronous, the frequency and phase differences are generated between the ripple components Vout1_ac and Vout2_ac. In this case, the frequency and phase differences are also generated between the ripple currents I1_ac and I2_ac flowing in the opposite directions between the electrodes 23 and 24. As a result, the ripple currents I1_ac and I2_ac flow between the electrodes 23 and 24 (flow through the stray capacitance Cf) without canceling each other. Therefore, the ripple current I_ac flowing through the stray capacitance Cf in the high speed mode is generally represented by the sum of the ripple currents I1_ac and I2_ac, and has a large value.

As the ripple current I_ac flowing through the stray capacitance Cf is larger, the surface temperature of the member (mold member made of a resin material) of the charger 2, which serves as a path through which the current flows, locally rises, thereby advancing carbonization, as described above. Repetition of this processing results in generation of tracking phenomenon in which a carbonized conductive path is formed between the electrodes 23 and 24 of the charger 2. To prevent generation of such tracking phenomenon, it is necessary to perform insulation design, for example, increase the distance between the electrodes 23 and 24. However, such insulation design not only prevents the image forming apparatus 100 (charger 2) from being downsized but also increases the apparatus cost. Furthermore, if the frequencies of the ripple components Vout1_ac and Vout2_ac of the output voltages are different, mutual interference between the outputs from the first and second high-voltage power supplies 401 and 402 may generate a beat component of a low frequency in the voltage to be output to the charger 2. This generates unevenness in an image formed by the image forming apparatus 100.

<Arrangement and Operation of High-Voltage Power Supply 200>

Figure 7:
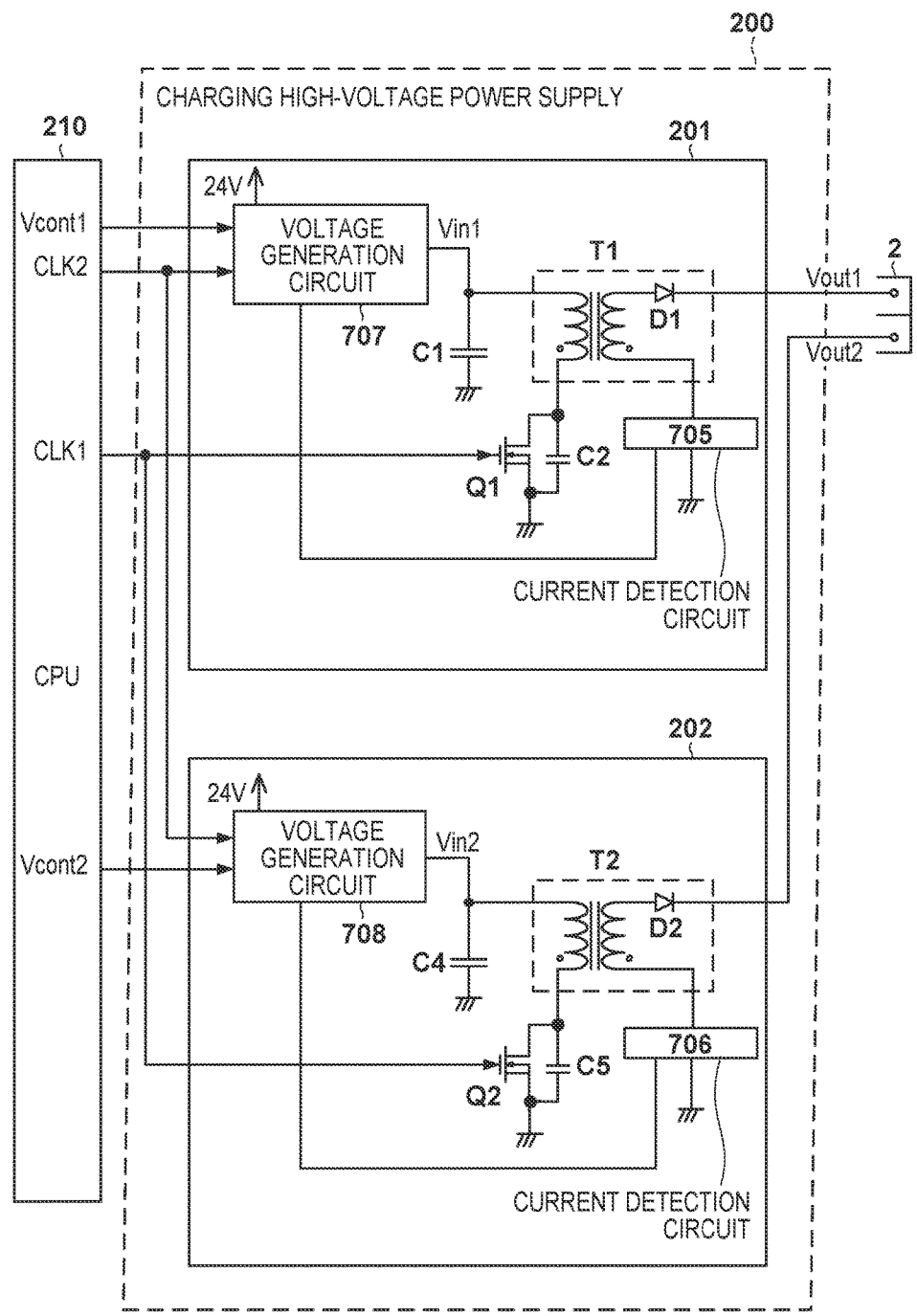
FIG. 7 is a circuit diagram showing an example of the circuit arrangement of a charging high-voltage power supply according to the first embodiment.

FIG. 7 is a circuit diagram showing an example of the circuit arrangement of the high-voltage power supply 200 according to this embodiment. The high-voltage power supply 200 is formed by the first and second high-voltage power supplies 201 and 202, and supplies high voltages to the respective wires of the charger 2. In this embodiment, the first high-voltage power supply 201 includes the transformer T1 for generating a voltage to be supplied to the first wire 21, and the second high-voltage power supply 202 includes the transformer T2 for generating a voltage to be supplied to the second wire 22. The first high-voltage power supply 201 supplies, to the first wire 21, a voltage generated by driving the transformer T1 in accordance with the first pulse signal. The second high-voltage power supply 202 supplies, to the second wire 22, a voltage generated by driving the transformer T2 in accordance with the second pulse signal having frequency and phase identical with those of the first pulse signal. In this embodiment, it is possible to decrease the ripple current I_ac flowing through the stray capacitance Cf by driving the transformers T1 and T2 of the first and second high-voltage power supplies 201 and 202 with the pulse signals having the same frequency and phase.

The arrangements and operations of the first and second high-voltage power supplies 201 and 202 will be described in more detail below with reference to the specific circuit arrangement example shown in FIG. 7. Note that in this example, the same pulse signal (CLK1) is used as the above-described first and second pulse signals.

The first high-voltage power supply 201 includes the transformer T1, the switching element Q1, a current detection circuit 705, and a voltage generation circuit (voltage generator) 707. The switching element Q1 is connected to the primary side of the transformer T1, and used to drive the transformer T1. The current detection circuit 705 detects an output current from the transformer T1 (an output current from the first high-voltage power supply 201). The voltage generation circuit 707 is connected to the primary side of the transformer T1, and generates, in accordance with the target value of the output voltage of the first high-voltage power supply 201, a DC voltage Vin1 to be input (applied) to the transformer T1.

Similarly to the first high-voltage power supply 201, the second high-voltage power supply 202 includes the transformer T2, a switching element Q2, a current detection circuit 706, and a voltage generation circuit 708. The switching element Q2 is connected to the primary side of the transformer T2, and used to drive the transformer T2. The current detection circuit 706 detects an output current from the transformer T2 (an output current from the second high-voltage power supply 202). The voltage generation circuit 708 is connected to the primary side of the transformer T2, and generates, in accordance with the target value of the output voltage of the second high-voltage power supply 202, a DC voltage Vin2 to be input (applied) to the transformer T2.

The CPU 210 controls the operation of the high-voltage power supply 200 (the first and second high-voltage power supplies 201 and 202) by the control signals Vcont1 and Vcont2, the driving signal CLK1 for the switching elements Q1 and Q2, and a setting signal CLK2 for the voltage generation circuits 707 and 708. The control signal Vcont1 is a signal for controlling the output current from the first high-voltage power supply 201 (transformer T1), and has a value corresponding to the desired output current of the first high-voltage power supply 201 (a value corresponding to the target value of the output voltage of the first high-voltage power supply 201). The control signal Vcont2 is a signal for controlling the output current from the second high-voltage power supply 202 (transformer T2), and has a value corresponding to the desired output current of the second high-voltage power supply 202 (a value corresponding to the target value of the output voltage of the second high-voltage power supply 202).

When execution of the image forming process starts, the CPU 210 starts to output the control signals Vcont1 and Vcont2 to the high-voltage power supply 200, and also starts to output the driving signal CLK1. The control signals Vcont1 and Vcont2 are input to the first and second high-voltage power supplies 201 and 202, respectively. Note that if the second high-voltage power supply 202 outputs no high voltage, for example, if the operation mode of the image forming apparatus 100 is the above-described low speed mode, the CPU 210 need not output the control signal Vcont2. Alternatively, the CPU 210 may output a control signal Vcout4 having a value that prevents the second high-voltage power supply 202 from outputting a high voltage.

The driving signal CLK1 is a pulse signal for driving the switching elements Q1 and Q2. The driving signal CLK1 input to the high-voltage power supply 200 is shared between the first and second high-voltage power supplies 201 and 202. That is, the CPU 210 outputs, as the first and second pulse signals, the same pulse signal to the first and second high-voltage power supplies 201 and 202, and the switching elements Q1 and Q2 are driven by the same pulse signal (CLK1). In this embodiment, the signal CLK1 is a pulse signal with a frequency of 25 kHz and a duty ratio of 50%. The switching element Q1 performs switching in accordance with the signal CLK1 output from the CPU 210, thereby driving the transformer T1. The switching element Q2 performs switching in accordance with the signal CLK1 output from the CPU 210, thereby driving the transformer T2.

The operation of the first high-voltage power supply 201 will be described below. The same applies to the second high-voltage power supply 202. In the first high-voltage power supply 201, the switching operation of the switching element Q1 causes switching of the DC voltage Vin1 to be input (applied) from the voltage generation circuit 707 to the transformer T1. The thus generated AC voltage is input to the primary winding (primary side) of the transformer T1, and then the transformer T1 generates, in the secondary winding (secondary side), a high voltage raised from the input AC voltage. The AC high voltage generated in the secondary winding of the transformer T1 is rectified by the diode D1. The high voltage having a positive polarity, which has been obtained by rectification, is supplied to the charger 2 as the output voltage Vout1 of the first high-voltage power supply 201.

The current detection circuit 705 detects an output current, corresponding to the output voltage Vout1, to be supplied to the charger 2, and outputs, as a detection signal, the detection value of the detected output current to the voltage generation circuit 707. Based on the detection result of the output current by the current detection circuit 705 connected to the secondary side of the transformer T1, the voltage generation circuit 707 generates a DC voltage (input voltage Vin1) to be input to the transformer T1. More specifically, the voltage generation circuit 707 controls the input voltage Vin1 to the transformer T1 so that the value of the detection signal output from the current detection circuit 705 is equal to the value of the control signal Vcont1 from the CPU 210. With this control operation, the first high-voltage power supply 201 supplies, to the charger 2, an output current of a desired value corresponding to the value of the control signal Vcont1.

In this embodiment, each of the voltage generation circuits 707 and 708 is formed by a switching power supply. The setting signal CLK2 output from the CPU 210 is a pulse signal for setting the switching frequency of each of the voltage generation circuits 707 and 708. Each of the voltage generation circuits 707 and 708 is driven by the signal CLK2 to perform a switching operation at a timing in synchronism with the signal CLK2. As described above, the signal CLK2 input to the high-voltage power supply 200 is shared between the first and second high-voltage power supplies 201 and 202. That is, the switching frequency is set in each of the voltage generation circuits 707 and 708 by the same signal CLK2.

The CPU 210 sets the frequency of the signal CLK2 to an integer multiple of the frequency of the signal CLK1. In this embodiment, as an example, the frequency of the signal CLK2 is set to 50 kHz which is twice a frequency of 25 kHz of the signal CLK1. It is possible to prevent a beat component of a low frequency causing charging unevenness from being generated in an output voltage to the charger 2 due to interference between the switching frequency of the voltage generation circuits 707 and 708 and that of the transformer T1.

Similarly to the high-voltage power supply 400 of the comparative example, the high-voltage power supply 200 of this embodiment has an arrangement in which it is possible to individually control the supply of high voltages from the first and second high-voltage power supplies 201 and 202 to the respective wires of the charger 2. The CPU 210 can control the operation of the high-voltage power supply 400 by the control signals Vcont1 and Vcont2 in accordance with the operation mode of the image forming apparatus 100.

In accordance with the control signals Vcont1 and Vcont2, the high-voltage power supply 200 operates as follows for each operation mode of the image forming apparatus 100. If the operation mode of the image forming apparatus 100 is the low speed mode, the high-voltage power supply 200 operates to supply a high voltage from the first high-voltage power supply 201 to the first wire 21 of the charger 2 and stop the supply of a high voltage from the second high-voltage power supply 202. On the other hand, if the operation mode of the image forming apparatus 100 is the high speed mode, the high-voltage power supply 200 operates to supply a high voltage from the first high-voltage power supply 201 to the first wire 21 of the charger 2 and supply a high voltage from the second high-voltage power supply 202 to the second wire 22 of the charger 2.

<Characteristic of High-Voltage Power Supply 200>

Figure 8:
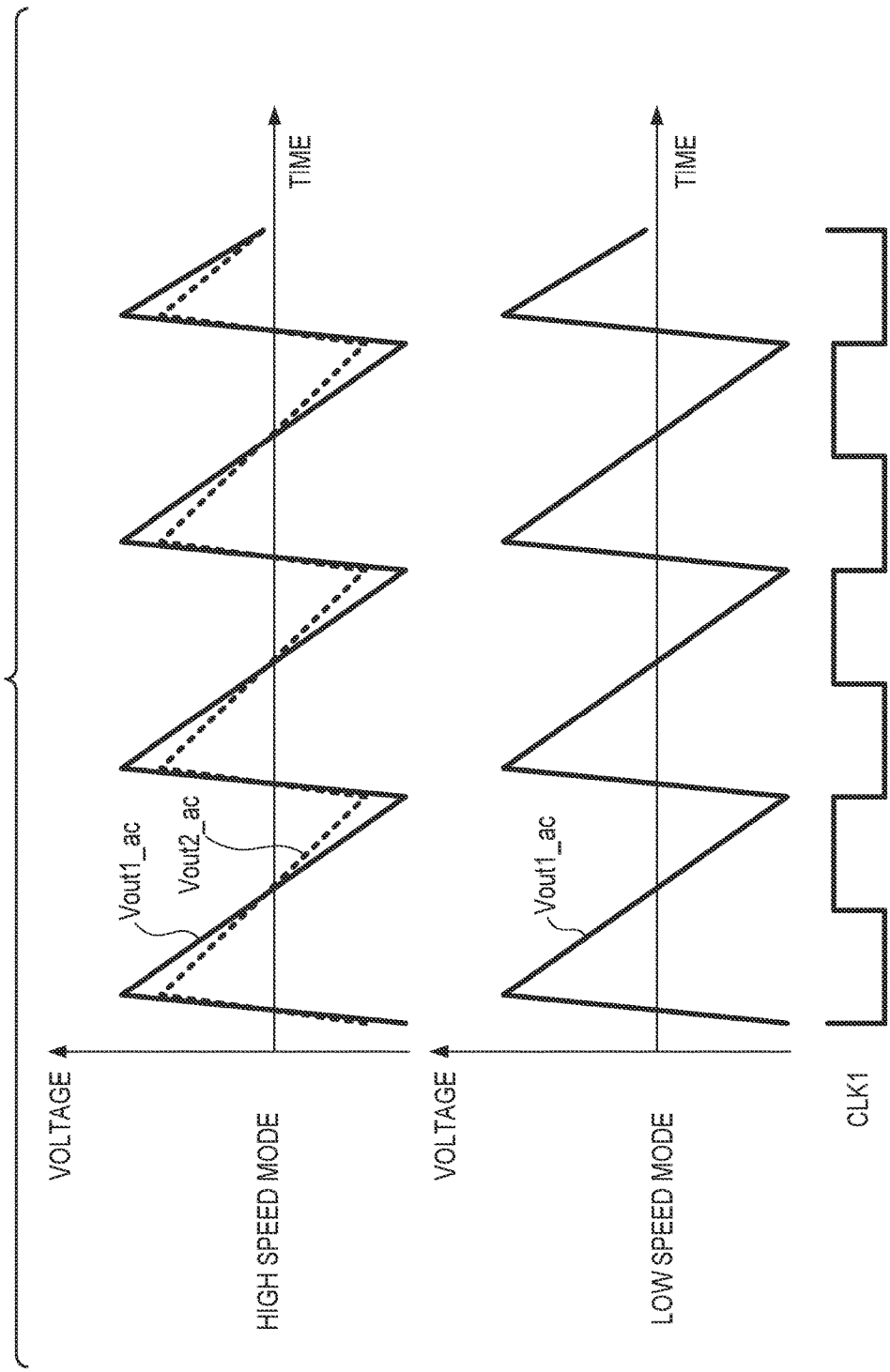
FIG. 8 shows examples of waveform of a driving signal CLK1 and waveforms of the ripple components of output voltages in the charging high-voltage power supply according to the first embodiment.

FIG. 8 shows examples of the waveform of the driving signal CLK1 for the switching elements Q1 and Q2, and the waveforms of the ripple components of the output voltages of the high-voltage power supply 200 in each operation mode of the image forming apparatus 100. In FIG. 8, Vout1_ac represents the ripple component of the output voltage Vout1 of the first high-voltage power supply 201, and Vout2_ac represents the ripple component of the output voltage Vout2 of the second high-voltage power supply 202.

As shown in FIG. 8, in the low speed mode, only the ripple component Vout1_ac corresponding to the first high-voltage power supply 201 is generated as the ripple component of the output voltage of the high-voltage power supply 200, similarly to the comparative example (FIG. 6). On the other hand, in the high speed mode, both the ripple component Vout1_ac corresponding to the first high-voltage power supply 201 and the ripple component Vout2_ac corresponding to the second high-voltage power supply 202 are generated as the ripple components of the output voltages of the high-voltage power supply 200.

Unlike the comparative example (FIG. 6), in the waveforms shown in FIG. 8, the frequencies and phases of the ripple component Vout1_ac of the output voltage of the first high-voltage power supply 201 and the ripple component Vout2_ac of the output voltage of the second high-voltage power supply 202 in the high speed mode respectively match. This is because, while differences in the frequency and phase are generated between the pulse signals PWM1 and PWM2 for driving the switching elements Q1 and Q2 of the high-voltage power supply 400 of the comparative example, the switching elements Q1 and Q2 are driven by the common signal CLK1 in the high-voltage power supply 200 of this embodiment. That is, this is because differences in the frequency and phase are not generated between the driving signal of the switching element Q1 and that of the switching element Q2.

If the ripple components of the output voltages of the high-voltage power supply 200 have the waveforms shown in FIG. 8, the ripple current I_ac flowing through the stray capacitance Cf (FIG. 3) existing between the electrodes 23 and 24 is represented as follows. When f3 represents the frequency of the signal CLK1, I1_ac represents the ripple current flowing through the stray capacitance Cf due to the ripple component Vout1_ac, and I2_ac represents the ripple current flowing through the stray capacitance Cf due to the ripple component Vout2_ac, the ripple currents I1_ac and I2_ac are given by:

$$I1\_ac = Vout1\_ac/(2\pi * f3 * Cf)$$

$$I2\_ac = Vout2\_ac/(2\pi * f3 * Cf)$$

Note that the ripple current I1_ac flows from the electrode 23 toward the electrode 24, and the ripple current I2_ac flows from the electrode 24 toward the electrode 23 (that is, in a direction opposite to that of the ripple current I1_ac).

Since the driving signal CLK1 is shared between the first and second high-voltage power supplies 201 and 202, the frequencies and phases of the ripple currents I1_ac and I2_ac respectively match, as given by the above equations.

If the operation mode of the image forming apparatus 100 is the high speed mode, both the first and second high-voltage power supplies 201 and 202 supply high voltages to the charger 2. In this case, since the frequencies and phases of the ripple currents I1_ac and I2_ac respectively match and the ripple currents I1_ac and I2_ac flow in the opposite directions, the ripple current I_ac flowing through the stray capacitance Cf is represented as the difference between the ripple currents I1_ac and I2_ac, given by:

$$I\_ac = I1\_ac - I2\_ac$$
$$= Vout1\_ac/(2\pi*f3*Cf) - Vout2\_ac/(2\pi*f3*Cf)$$
$$= (Vout1\_ac - Vout2\_ac)/(2\pi*f3*Cf)$$

Since the ripple components Vout1_ac and Vout2_ac are synchronous in frequencies and phases, Vout2_ac=α*Vout1_ac can be obtained. Thus, the ripple current I_ac is given by:

$$I\_ac=(1-\alpha)Vout1\_ac/(2\pi*f3*Cf)$$

For example, for α=0.9, $$I\_ac=(1-0.9)Vout1\_ac/(2\pi*f3*Cf)=0.1Vout1\_ac$$

As described above, the high-voltage power supply 200 of this embodiment can decrease the ripple current I_ac flowing through the stray capacitance Cf to a very small value, as compared with a case in which the pulse signals PWM1 and PWM2 for respectively driving the switching elements Q1 and Q2 are asynchronous as in the comparative example. As α is closer to 1 (that is, the degree of matching between the ripple components Vout1_ac and Vout2_ac is higher), the ripple current I_ac flowing through the stray capacitance Cf is smaller. Since the ripple current I_ac can be decreased, generation of tracking phenomenon between the electrodes 23 and 24 of the charger 2 can be prevented as described above.

If the operation mode of the image forming apparatus 100 is the low speed mode, the first high-voltage power supply 201 supplies a high voltage to the charger 2 and the supply of a high voltage from the second high-voltage power supply 202 to the charger 2 is stopped. Therefore, the ripple current I_ac flowing through the stray capacitance Cf is given by:

$$I\_ac=I1\_ac=Vout1\_ac/(2\pi*f3*Cf)$$

Thus, if the operation mode is the low speed mode, the ripple current I_ac can be larger than that when the operation mode is the high speed mode. Even in this case, the ripple current I_ac is smaller than that in the high-voltage power supply 400 of the comparative example when the operation mode is the high speed mode. Thus, even if the operation mode is the low speed mode, it is possible to prevent generation of tracking phenomenon between the electrodes 23 and 24 of the charger 2.

As described above, in this embodiment, the transformers T1 and T2 of the first and second high-voltage power supplies 201 and 202 are driven by the pulse signals having the same frequency and phase, thereby operating the first and second high-voltage power supplies 201 and 202. This can reduce the ripple current flowing through the stray capacitance Cf between the electrodes 23 and 24 (between the first and second wires 21 and 22) of the charger 2. Consequently, it is possible to perform insulation design of the charger 2 without providing unnecessary space around the charger 2 in the image forming apparatus 100 or increasing the apparatus cost. Furthermore, it is possible to prevent a beat component of a low frequency from being generated in an output voltage to the charger 2 due to mutual interference between the outputs from the first and second high-voltage power supplies 201 and 202 and also prevent unevenness from being generated in the formed image due to the beat component.

This embodiment has explained a case in which the output voltages Vout1 and Vout2 of the first and second high-voltage power supplies 201 and 202 each have the positive polarity. However, the embodiment can be implemented in the same manner even if the output voltages each have the negative polarity. In this embodiment, as an example, the frequencies of the signals CLK1 and CLK2 are set to 25 kHz and 50 kHz, respectively. However, different frequencies can be set as the frequencies of the signals CLK1 and CLK2 while maintaining the relationship in which the frequency of the signal CLK2 is an integer multiple of the frequency of the signal CLK1.

Second Embodiment

The second embodiment will describe an example in which first and second high-voltage power supplies 201 and 202 are implemented by circuit arrangements different from those according to the first embodiment. For the sake of descriptive simplicity, the difference from the first embodiment will mainly be described below.

Figure 9:
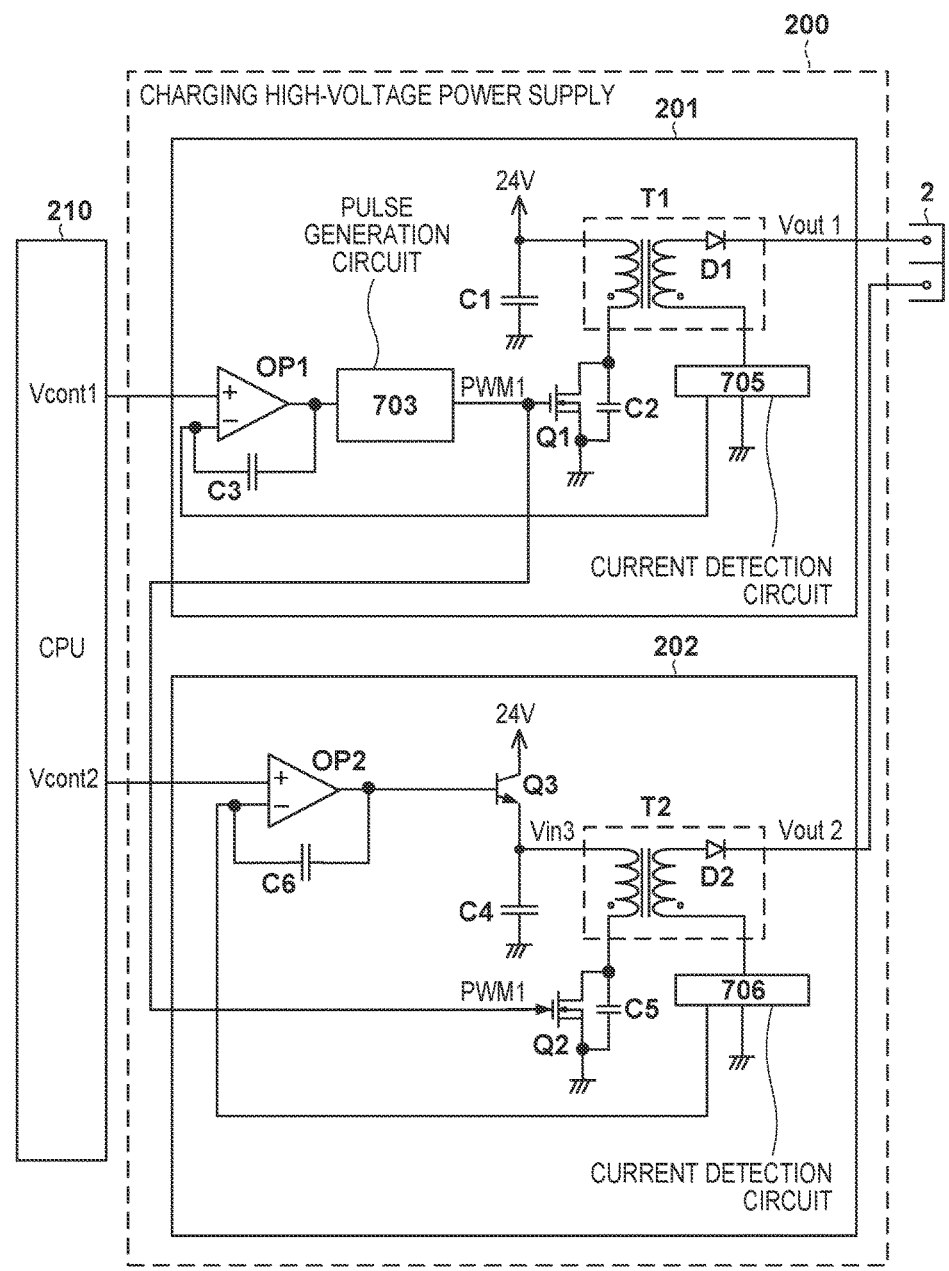
FIG. 9 is a circuit diagram showing an example of the circuit arrangement of a charging high-voltage power supply according to the second embodiment.

FIG. 9 is a circuit diagram showing an example of the circuit arrangement of a high-voltage power supply 200 according to this embodiment. Similarly to the first embodiment, the high-voltage power supply 200 is formed by the first and second high-voltage power supplies 201 and 202 and supplies high voltages to the respective wires of a charger 2. As shown in FIG. 9, the first and second high-voltage power supplies 201 and 202 have arrangements different from those (FIG. 7) according to the first embodiment.

The first high-voltage power supply 201 has the same arrangement as that of the first high-voltage power supply 401 described in the comparative example, and performs the same operation. The operational amplifier OP1, the pulse generation circuit 403, the transformer T1, the switching element Q1, and the current detection circuit 405 in the first high-voltage power supply 401 correspond to an operational amplifier OP1, a pulse generation circuit 403, a transformer T1, a switching element Q1, and a current detection circuit 705 in the first high-voltage power supply 201 shown in FIG. 9, respectively. The second high-voltage power supply 202 includes an operational amplifier OP2, a transformer T2, a switching element Q2, a transistor Q3, and a current detection circuit 706.

The switching elements Q1 and Q2 are used to drive the transformers T1 and T2, respectively. The transistor Q3 is used to control an input voltage Vin3 to the transformer T2. The current detection circuit 705 detects an output current from the transformer T1 (an output current from the first high-voltage power supply 201). The current detection circuit 706 detects an output current from the transformer T2 (an output current from the second high-voltage power supply 202).

A CPU 210 controls the operation of the high-voltage power supply 200 by control signals Vcont1 and Vcont2. Similarly to the first embodiment, the control signal Vcont1 is a signal for controlling the output current from the first high-voltage power supply 201 (transformer T1), and the control signal Vcont2 is a signal for controlling the output current from the second high-voltage power supply 202 (transformer T2). The control signals Vcont1 and Vcont2 are signals having values corresponding to desired output currents.

When execution of an image forming process starts, the CPU 210 starts to output the control signals Vcont1 and Vcont2 to the high-voltage power supply 200. The control signals Vcont1 and Vcont2 are input to the positive input terminals of the operational amplifiers OP1 and OP2, respectively. On the other hand, detection signals output from the current detection circuits 705 and 706 are input to the negative input terminals of the operational amplifiers OP1 and OP2, respectively.

(Operation of First High-Voltage Power Supply 201)

The first high-voltage power supply 201 controls the output voltage of the operational amplifier OP1 so that the value of the control signal Vcont1 from the CPU 210 is equal to the value of the detection signal output from the current detection circuit 705. With this control operation, the first high-voltage power supply 201 supplies, to the charger 2, an output current of a desired value corresponding to the value of the control signal Vcont1. The output voltage of the operational amplifier OP1 is input to the pulse generation circuit 703.

Similarly to the pulse generation circuit 403 (FIG. 4), the pulse generation circuit 703 outputs, to the switching element Q1, a pulse signal PWM1 having a pulse width that sets a current output from the secondary side of the transformer T1 to a desired value. That is, the pulse generation circuit 703 controls the width of each pulse of the pulse signal PWM1 in accordance with the target value of the output voltage of the first high-voltage power supply 201. In this embodiment, the pulse signal PWM1 output from the pulse generation circuit 703 is sent not only to the switching element Q1 but also to the second high-voltage power supply 202 to be supplied to the switching element Q2. In this way, the first pulse signal (PWM1) generated by the pulse generation circuit 703 is supplied to the switching element Q1, and also supplied to the switching element Q2 as the second pulse signal.

The switching element Q1 performs switching in accordance with the pulse signal PWM1. The switching operation of the switching element Q1 causes switching of a predetermined DC voltage (24 V) to be input (applied) to the transformer T1. The thus generated AC voltage is input to the primary winding of the transformer T1, and then the transformer T1 generates, in the secondary winding, a high voltage raised from the input AC voltage.

The AC high voltage generated in the secondary winding of the transformer T1 is rectified by a diode D1. A high voltage having a positive polarity, which has been obtained by rectification, is supplied to the charger 2 as an output voltage Vout1 of the first high-voltage power supply 201. Note that the current detection circuit 705 detects an output current corresponding to the output voltage Vout1 and supplied to the charger 2, and outputs, as a detection signal, the detection value of the detected output current to the negative input terminal of the operational amplifier OP1.

(Operation of Second High-Voltage Power Supply 202)

The second high-voltage power supply 202 controls the output voltage of the operational amplifier OP2 so that the value of the control signal Vcont2 from the CPU 210 (a value corresponding to the target value of the output voltage of the second high-voltage power supply 202) is equal to the value of the detection signal output from the current detection circuit 706. The output voltage of the operational amplifier OP2 is input to the base terminal of the transistor Q3. The transistor Q3 operates to control, in accordance with the voltage output from the operational amplifier OP2, the voltage Vin3 to be input (applied) to the transformer T2. With this control operation, the second high-voltage power supply 202 supplies, to the charger 2, an output current of a desired value corresponding to the value of the control signal Vcont2. In this way, the operational amplifier OP2 and the transistor Q3 according to this embodiment function as an example of a voltage generation unit for generating a voltage to be input to the transformer T2 in accordance with the target value of the output voltage of the second high-voltage power supply 202.

The switching element Q2 drives the transformer T2 by performing switching (the ON/OFF operation of the gate) in accordance with the pulse signal PWM1 generated by the pulse generation circuit 703. More specifically, the switching operation of the switching element Q2 causes switching of the voltage Vin3 to be input (applied) to the transformer T1. The thus generated AC voltage is input to the primary winding of the transformer T2, and then the transformer T2 generates a high voltage raised from the input AC voltage in the secondary winding.

The AC high voltage generated in the secondary winding of the transformer T2 is rectified by a diode D2. A high voltage having a positive polarity, which has been obtained by rectification, is supplied to the charger 2 as an output voltage Vout2 of the second high-voltage power supply 202. Note that the current detection circuit 706 detects an output current corresponding to the output voltage Vout2 and supplied to the charger 2, and outputs, as a detection signal, the detection value of the detected output current to the negative input terminal of the operational amplifier OP2.

Similarly to the first embodiment, the high-voltage power supply 200 according to this embodiment has an arrangement in which it is possible to individually control the supply of high voltages from the first and second high-voltage power supplies 201 and 202 to the respective wires of the charger 2. The CPU 210 can control the operation of the high-voltage power supply 200 by the control signals Vcont1 and Vcont2 in accordance with the operation mode of the image forming apparatus 100. Similarly to the first embodiment, the high-voltage power supply 200 executes an operation for each operation mode of the image forming apparatus 100 in accordance with the control signals Vcont1 and Vcont2.

In the high-voltage power supply 200 according to this embodiment, the voltage generation circuits 707 and 708 used in the first embodiment are unnecessary. Thus, according to this embodiment, the circuit arrangement of the high-voltage power supply 200 can be simplified, as compared with the first embodiment. Note that in this embodiment, the second high-voltage power supply 202 needs to acquire the pulse signal PWM1 from the first high-voltage power supply 201. Therefore, the second high-voltage power supply 202 can output a high voltage while the first high-voltage power supply 201 outputs a high voltage.

In the second high-voltage power supply 202 according to this embodiment, the input voltage Vin3 of the transformer T2 is lower than a predetermined DC voltage (24 V) by the collector-emitter voltage of the transistor Q3. If the transformers T1 and T2 have the same specifications, the output voltage Vout2 of the second high-voltage power supply 202 is lower than the output voltage Vout1 of the first high-voltage power supply 201. If it is necessary to control the output voltages of the first and second high-voltage power supplies 201 and 202 to the same value, a transformer having specifications different from those of the transformer T1 may be used as the transformer T2.

Figure 10:
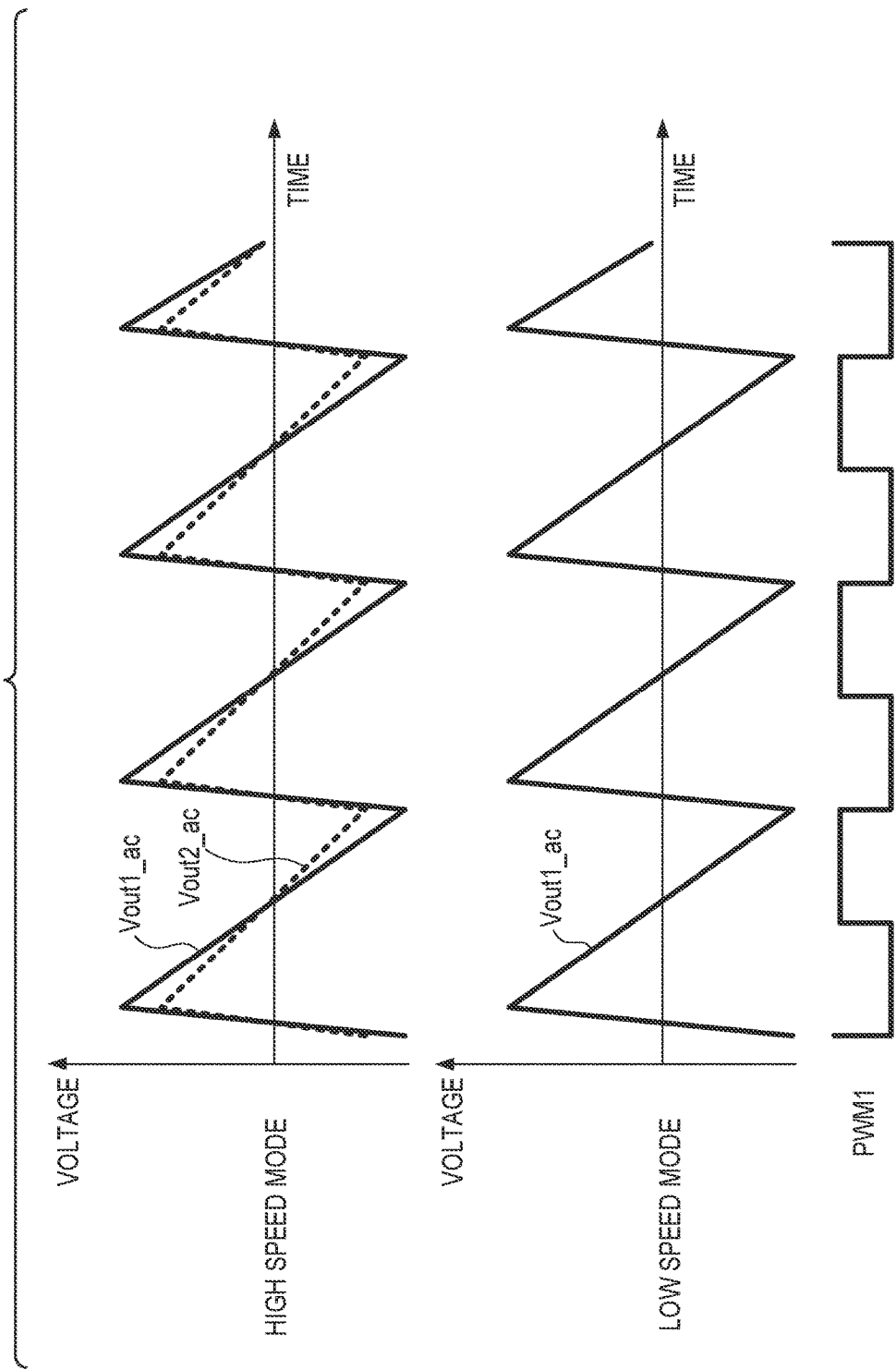
FIG. 10 shows examples of waveform of a pulse signal PWM1 and waveforms of the ripple components of output voltages in a charging high-voltage power supply according to the second and third embodiments.

FIG. 10 shows examples of the waveform of the pulse signal PWM1 for driving the switching elements Q1 and Q2 and the waveforms of the ripple components of the output voltages of the high-voltage power supply 200 in each operation mode of the image forming apparatus 100. In FIG. 10, Vout1_ac and Vout2_ac represent the ripple components of the output voltages Vout1 and Vout2 of the first high-voltage power supply 201.

As shown in FIG. 10, in each of the low speed mode and the high speed mode, Vout1_ac and Vout2_ac indicate the same waveforms as those (FIG. 8) according to the first embodiment. Especially in the high speed mode, the frequencies and phases of the ripple component Vout1_ac of the output voltage of the first high-voltage power supply 201 and the ripple component Vout2_ac of the output voltage of the second high-voltage power supply 202 respectively match, similarly to the first embodiment. This is because in the high-voltage power supply 200 according to this embodiment, the switching elements Q1 and Q2 are driven by the common pulse signal PWM1. That is, this is because the frequency and phase differences are not generated between the driving signal of the switching element Q1 and that of the switching element Q2. In this case, a ripple current I_ac flowing through a stray capacitance Cf (FIG. 3) can be reduced to a very small value, similarly to the first embodiment.

As described above, similarly to the first embodiment, the high-voltage power supply 200 according to this embodiment operates the first and second high-voltage power supplies 201 and 202 by driving the transformers T1 and T2 of the first and second high-voltage power supplies 201 and 202 by pulse signals having the same frequency and phase. This makes it possible to obtain the same advantages as in the first embodiment.

Third Embodiment

The third embodiment will describe an example in which a second high-voltage power supply 202 is implemented by a circuit arrangement different from that according to the second embodiment. For the sake of descriptive simplicity, the difference from the first and second embodiments will mainly be described.

Figure 11:
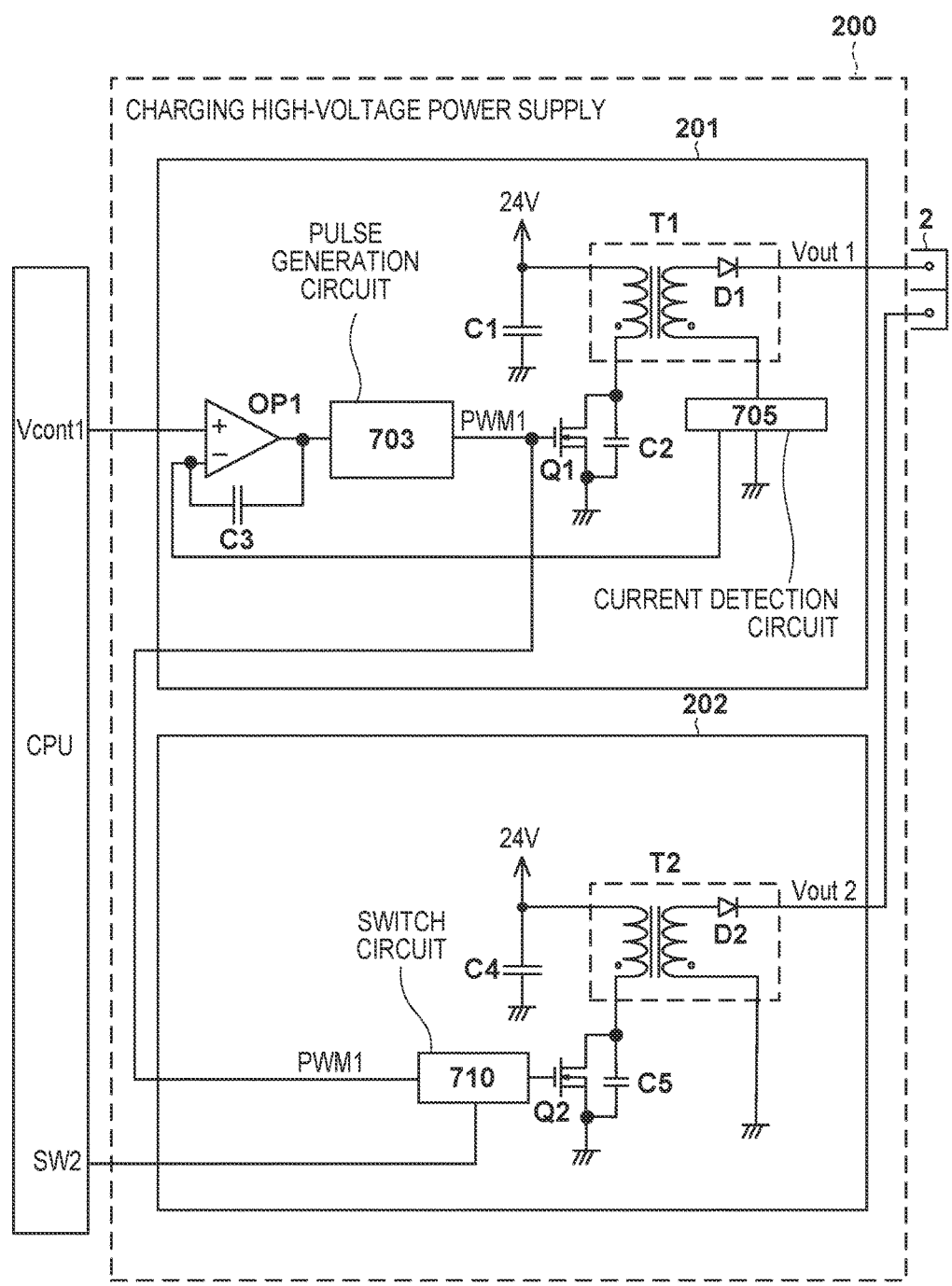
FIG. 11 is a circuit diagram showing an example of the circuit arrangement of a charging high-voltage power supply according to the third embodiment.

FIG. 11 is a circuit diagram showing an example of the circuit arrangement of a high-voltage power supply 200 according to this embodiment. Similarly to the first and second embodiments, the high-voltage power supply 200 is formed by a first high-voltage power supply 201 and the second high-voltage power supply 202, and supplies high voltages to the respective wires of a charger 2. The first high-voltage power supply 201 has the same arrangement as that of the first high-voltage power supply 201 according to the second embodiment, and performs the same operation. A detailed description of the first high-voltage power supply 201 will be omitted.

The second high-voltage power supply 202 includes a transformer T2, a switching element Q2, and a switch circuit 710. Similarly to the first and second embodiments, the switching element Q2 is used to drive the transformer T2. In this embodiment, similarly to the second embodiment, a pulse signal PWM1 output from a pulse generation circuit 703 of the first high-voltage power supply 201 is sent not only to the switching element Q1 but also to the second high-voltage power supply 202. In the second high-voltage power supply 202, the pulse signal PWM1 obtained from the first high-voltage power supply 201 is input to the switch circuit 710. The switch circuit 710 is provided in the supply line of the pulse signal PWM1 from the pulse generation circuit 703 to the switching element Q2. The switch circuit 710 switches the state of the supply line of the pulse signal PWM1 between a conductive state and a non-conductive state in accordance with a switching signal SW2 output from a CPU 210. This controls an output voltage Vout2 of the second high-voltage power supply 202.

In this embodiment, when execution of an image forming process starts, the CPU 210 starts to output a control signal Vcont1 to the high-voltage power supply 200. Similarly to the second embodiment, the control signal Vcont1 is input to the positive input terminal of an operational amplifier OP1. Furthermore, the CPU 210 starts to output the switching signal SW2 for controlling switching of the state of the supply line of the pulse signal PWM1 by the switch circuit 710. As described above, the switching signal SW2 is input to the switch circuit 710. Note that the CPU 210 sets the logical value of the switching signal SW2 to control switching of the state of the supply line by the switch circuit 710 in accordance with the target value of the output voltage of the second high-voltage power supply 202.

When causing the second high-voltage power supply 202 to output a high voltage (supply a high voltage to the charger 2), the CPU 210 sets the logical value of the switching signal SW2 to be supplied to the second high-voltage power supply 202 so that the switch circuit 710 is set in the conductive state. On the other hand, when stopping the output of the high voltage from the second high-voltage power supply, the CPU 210 sets the logical value of the switching signal SW2 to be supplied to the second high-voltage power supply 202 so that the switch circuit 710 is set in the non-conductive state.

If the switch circuit 710 is set in the conductive state, the pulse signal PWM1 generated by the pulse generation circuit 703 is supplied to the switching element Q2 via the switch circuit 710. Similarly to the second embodiment, the switching element Q2 drives the transformer T2 by performing switching in accordance with the pulse signal PWM1 generated by the pulse generation circuit 703. More specifically, the switching operation of the switching element Q2 causes switching of a predetermined DC voltage (24 V) to be input (applied) to the transformer T2. The thus generated AC voltage is input to the primary winding of the transformer T2, and then the transformer T2 generates, in the secondary winding, a high voltage raised from the input AC voltage.

The AC high voltage generated in the secondary winding of the transformer T2 is rectified by a diode D2. A high voltage having a positive polarity, which has been obtained by rectification, is supplied to the charger 2 as the output voltage Vout2 of the second high-voltage power supply 202. Note that the second high-voltage power supply 202 according to this embodiment is provided with no current detection circuit for detecting an output current, unlike the second embodiment.

Similarly to the first and second embodiments, the high-voltage power supply 200 according to this embodiment has an arrangement in which it is possible to individually control the supply of high voltages from the first and second high-voltage power supplies 201 and 202 to the respective wires of the charger 2. The CPU 210 can control the operation of a high-voltage power supply 400 by the control signal Vcont1 and the switching signal SW2 in accordance with the operation mode of the image forming apparatus 100. Similarly to the first embodiment, the high-voltage power supply 200 executes an operation for each operation mode of the image forming apparatus 100 in accordance with the control signal Vcont1 and the switching signal SW2.

In the high-voltage power supply 200 according to this embodiment, the second high-voltage power supply 202 performs neither detection of the output current of the high-voltage power supply 200 nor feedback control of an output current based on a detection result, unlike the second embodiment. Instead, the second high-voltage power supply 202 shares, with the first high-voltage power supply 201, as a pulse signal for driving the transformer T2, the pulse signal PWM1 used for feedback control in the first high-voltage power supply 201. Therefore, the second high-voltage power supply 202 can output the high voltage while the first high-voltage power supply 201 outputs the high voltage and the switch circuit 710 is in the conductive state.

Since the second high-voltage power supply 202 according to this embodiment performs no feedback control of the output current, a tolerance for the value of the output current may become large, as compared with the first high-voltage power supply 201. In this embodiment, however, the transistor Q3 and the current detection circuit 706 used in the second high-voltage power supply 202 according to the second embodiment are unnecessary. Thus, according to this embodiment, the circuit arrangement of the high-voltage power supply 200 can be simplified, as compared with the first and second embodiments.

The waveform of the pulse signal PWM1 for driving the switching elements Q1 and Q2 and the waveforms of the ripple components of the output voltages of the high-voltage power supply 200 in each operation mode of the image forming apparatus 100 are as shown in FIG. 10. Therefore, similarly to the first and second embodiments, the high-voltage power supply 200 according to this embodiment can reduce a ripple current I_ac flowing through a stray capacitance Cf (FIG. 3) to a very small value.

As described above, similarly to the first and second embodiments, the high-voltage power supply 200 according to this embodiment operates the first and second high-voltage power supplies 201 and 202 by driving the transformers T1 and T2 of the first and second high-voltage power supplies 201 and 202 by pulse signals having the same frequency and phase. This makes it possible to obtain the same advantages as in the first and second embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-230564, filed Nov. 28, 2016, which is hereby incorporated by reference herein in its entirety.

What is claimed is:

1. An image forming apparatus comprising:
a photosensitive member;
an exposure unit configured to expose the photosensitive member to form an electrostatic latent image on the photosensitive member;
a charger, arranged upstream of a position of exposure for the photosensitive member by the exposure unit in a rotation direction of the photosensitive member, including a first discharge electrode and a second discharge electrode and configured to charge the photosensitive member to be an identical polarity, before exposure by the exposure unit, by discharge caused by voltages being supplied to the first discharge electrode and the second discharge electrode;
a first high-voltage power supply including a first transformer that generates a voltage to be supplied to the first discharge electrode and configured to supply, to the first discharge electrode, the voltage generated by driving the first transformer in accordance with a first pulse signal;
a second high-voltage power supply including a second transformer that generates a voltage having a polarity identical with that of the voltage generated by the first high-voltage power supply and to be supplied to the second discharge electrode, and configured to supply, to the second discharge electrode, the voltage generated by driving the second transformer in accordance with a second pulse signal having frequency and phase identical with those of the first pulse signal; and
a controller configured to control the first high-voltage power supply and the second high-voltage power supply;
wherein the second pulse signal is a signal branched from the first pulse signal.

2. The apparatus according to claim 1, wherein
the first high-voltage power supply includes a first switching element connected to a primary side of the first transformer and configured to drive the first transformer by performing switching in accordance with the first pulse signal, and
the second high-voltage power supply includes a second switching element connected to a primary side of the second transformer and configured to drive the second transformer by performing switching in accordance with the second pulse signal.

3. The apparatus according to claim 2, wherein
the first high-voltage power supply includes a first voltage generator connected to the primary side of the first transformer and configured to generate, in accordance with a target value of an output voltage of the first high-voltage power supply, a DC voltage to be input to the first transformer, and
the second high-voltage power supply includes a second voltage generator connected to the primary side of the second transformer and configured to generate, in accordance with a target value of an output voltage of the second high-voltage power supply, a DC voltage to be input to the second transformer.

4. The apparatus according to claim 3, wherein the first voltage generator and the second voltage generator are switching power supplies each driven by a pulse signal having a frequency equal to an integer multiple of the frequency of the first pulse signal and the second pulse signal.

5. The apparatus according to claim 3, wherein each of the first voltage generator and the second voltage generator generates, based on a detection result of an output current by a current detector connected to a secondary side of the corresponding transformer, a DC voltage to be input to the corresponding transformer.

6. The apparatus according to claim 2, wherein
the first high-voltage power supply includes a pulse generator configured to generate the first pulse signal, and
the first pulse signal generated by the pulse generator is supplied to the first switching element and is also supplied to the second switching element as the second pulse signal.

7. The apparatus according to claim 6, wherein the pulse generator controls a width of each pulse of the first pulse signal in accordance with a target value of an output voltage of the first high-voltage power supply.

8. The apparatus according to claim 6, wherein
a predetermined DC voltage is input to the first transformer, and
the second high-voltage power supply includes a voltage generator configured to generate, in accordance with a target value of an output voltage of the second high-voltage power supply, a voltage to be input to the second transformer.

9. The apparatus according to claim 6, wherein the second high-voltage power supply includes a switch circuit provided in a supply line of the first pulse signal from the pulse generator to the second switching element and configured to control an output voltage of the second high-voltage power supply by switching a state of the supply line between a conductive state and a non-conductive state.

10. The apparatus according to claim 9, further comprising:
a controller configured to control the first high-voltage power supply and the second high-voltage power supply,
wherein the controller controls switching of the state of the supply line by the switch circuit in accordance with a target value of the output voltage of the second high-voltage power supply.

11. The apparatus according to claim 1, further comprising:
an image forming unit including the photosensitive member, the exposure unit and the charger and configured to form, on the photosensitive member, an image to be transferred to a sheet by forming, by the exposure unit, the electrostatic latent image on the photosensitive member charged by the charger and developing the electrostatic latent image.

12. The apparatus according to claim 1, wherein the charger is a scorotron charger including: a first casing provided with the first discharge electrode; and a second casing insulated from the first casing by an insulating member and provided with the second discharge electrode.

13. The apparatus according to claim 1, wherein the charger includes
a first grid electrode configured to control a discharge current from the first discharge electrode, and
a second grid electrode configured to control a discharge current from the second discharge electrode.

* * * * *